United States Patent
Lee et al.

(10) Patent No.: US 10,466,361 B2
(45) Date of Patent: Nov. 5, 2019

(54) SYSTEMS AND METHODS FOR MULTI-SENSOR FUSION USING PERMUTATION MATRIX TRACK ASSOCIATION

(71) Applicant: Toyota Research Institute, Inc., Los Altos, CA (US)

(72) Inventors: Kuan-Hui Lee, Ann Arbor, MI (US); Yusuke Kanzawa, Ann Arbor, MI (US); Matthew O. Derry, Ann Arbor, MI (US); Michael R. James, Northville, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 179 days.

(21) Appl. No.: 15/601,433

(22) Filed: May 22, 2017

(65) Prior Publication Data
US 2018/0267544 A1    Sep. 20, 2018

Related U.S. Application Data

(60) Provisional application No. 62/471,010, filed on Mar. 14, 2017.

(51) Int. Cl.
*G01S 17/93* (2006.01)
*G01S 17/02* (2006.01)
(Continued)

(52) U.S. Cl.
CPC .......... *G01S 17/936* (2013.01); *G01S 5/0263* (2013.01); *G01S 5/0278* (2013.01); *G01S 13/726* (2013.01);
(Continued)

(58) Field of Classification Search
CPC .... G01S 17/936; G01S 5/0263; G01S 5/0278; G01S 13/726; G01S 13/862; G01S 13/867; G01S 13/931; G01S 13/87
See application file for complete search history.

(56) References Cited

U.S. PATENT DOCUMENTS

| 5,293,455 A | 3/1994 | Castelaz |
| 7,065,465 B2 | 6/2006 | Chen et al. |

(Continued)

OTHER PUBLICATIONS

Cho et al. in "A Multi-Sensor Fusion System for Moving Object Detection and Tracking in Urban Driving Environments" 2014 IEEE International Conference on Robotics & Automation (ICRA) Hong Kong Convention and Exhibition Center May 31-Jun. 7, 2014. Hong Kong, China, pp. 1836-1843.

(Continued)

*Primary Examiner* — Anne M Antonucci
*Assistant Examiner* — Renee LaRose
(74) *Attorney, Agent, or Firm* — Christopher G. Darrow; Darrow Mustafa PC

(57) ABSTRACT

System, methods, and other embodiments described herein relate to associating disparate tracks from multiple sensor inputs for observed objects. In one embodiment, a method includes, in response to receiving a first input from a first sensor and a second input from a second sensor, generating the disparate tracks including first sensor tracks and second sensor tracks for the observed objects that correspond to the first input and the second input. The method includes identifying correlations between the first sensor tracks and the second sensor tracks by computing association likelihoods between the first tracks and the second tracks within a permutation matrix according to an objective cost function. The method includes controlling a vehicle according to the correlations.

18 Claims, 7 Drawing Sheets

(51) Int. Cl.
| | |
|---|---|
| G01S 5/02 | (2010.01) |
| G01S 13/72 | (2006.01) |
| G01S 13/86 | (2006.01) |
| G01S 13/93 | (2006.01) |
| G01S 15/93 | (2006.01) |
| G01S 15/02 | (2006.01) |
| G01S 13/87 | (2006.01) |

(52) U.S. Cl.
CPC .......... *G01S 13/865* (2013.01); *G01S 13/867* (2013.01); *G01S 13/931* (2013.01); *G01S 17/023* (2013.01); *G01S 13/87* (2013.01); *G01S 15/025* (2013.01); *G01S 15/931* (2013.01); *G01S 2013/935* (2013.01); *G01S 2013/9342* (2013.01); *G01S 2013/9346* (2013.01); *G01S 2013/9364* (2013.01); *G01S 2013/9367* (2013.01)

(56) References Cited

U.S. PATENT DOCUMENTS

| | | | |
|---|---|---|---|
| 7,542,825 | B2 | 6/2009 | Kawasaki |
| 7,747,364 | B2 | 6/2010 | Roy et al. |
| 8,412,723 | B2 | 4/2013 | Wolman |
| 9,053,433 | B2 | 6/2015 | Will et al. |
| 2018/0136660 | A1* | 5/2018 | Mudalige ............... G05D 1/021 |

OTHER PUBLICATIONS

Chu et al. in "Tracking Across Nonoverlapping Cameras Based on the Unsupervised Learning of Camera Link Models," undated in 6 pages.
H. Chiu et al., "A new point matching algorithm for nonrigid registration," Computer Vision and Image Understanding, vol. 89, pp. 114-141, 2003.
S. Julier et al., "General decentralized data fusion with covariance intersection (ci)," in Multisensor Data Fusion. CRC Press, 2001.
X. Tian et al., "On algorithms for asynchronous track-to-track fusion," in IEEE International Conference on Information Fusion, 2010.
A. Houenou, et al., "A track-to-track association method for automotive perception" in IEEE Intelligent Vehicles Symposium, 2012, pp. 704-710.
R. Mobus et al., "Multi-target multi-object tracking, sensor fusion of radar and infrared," in IEEE Intelligent Vehicles Symposium, 2004, pp. 732-737.
J. Liu, et al., "Multitarget tracking in distributed sensor networks," IEEE Signal Processing Magazine, vol. 24, No. 3, pp. 36-46, 2007.
M. Aeberhchen and N. Kaempchen, "High-level sensor data fusion architecture for vehicle surround environment perception," in International Workshop Intelligent Transportation, 2011.
C. Urmson, J. Anhalt, D. Bagnell, C. Baker, R. Bittner, M. Clark, J. Dolan, D. Duggins, T. Galatali, C. Geyer et al., "Autonomous driving in urban environments: Boss and the urban challenge," Journal of Field Robotics, vol. 25, No. 8, pp. 425-466, 2008.
J. Leonard, J. How, S. I eller, M. Berger, S. Campbell, G. Fiore, L. Fletcher, E. Frazzoli, A. Huang, S. Karaman, O. Koch, Y. Kuwata, D. Moore, E. Olson, S. Peters, J. Teo, R. Truax, M. Walter, D. Barrett, A. Epstein, K. Maheloni, K. Moyer, T. Jones, R. Buckley, M. Antone, R. Galejs, S. Krishnamurthy, and J. Williams, A perception-driven autonomous vehicle.
M. Montemerlo, J. Becker, S. Bhat, H. Dahlkamp, D. Dolgov, S. Ettinger, D. Haehnel, T. Hilden, G. Hoffmann, B. Huhnke et al., "Junior: The stanford entry in the urban challenge," Journal of Field Robotics, vol. 25, No. 9, pp. 569-597, 2008.
M. Darms, P. Rybski, C. R. Baker, and C. Urmson, "Obstacle detection and tracking for the urban challenge," IEEE Transactions on Intelligent Transportation Systems, vol. 10, No. 3, pp. 475-485, Sep. 2009.
D. Held, D. Guillory, B. Rebsamen, S. Thrun, and S. Savarese, "A probabilistic framework for real-time 3d segmentation using spatial, temporal, and semantic cues," in Robotics: Science and Systems, Jun. 2016.
C. Premebida, O. Ludwig, and U. Nunes, "Lidar and vision-based pedestrian detection system," Journal of Field Robotics, vol. 26, No. 9, pp. 696-711, 2009.
T.-D. Vu, O. Aycard, and F. Tango, "Object perception for intelligent vehicle applications: A multi-sensor fusion approach," in IEEE Intelligent Vehicles Symposium, Jun. 2014, pp. 774-780.
H. Cho, Y.-W. Seo, B. V. Kumar, and R. Rajkumar, "A multi-sensor fusion system for moving object detection and tracking in urban driving environments," in IEEE International Conference on Robotics and Automation, May 2016.
M. Aeberhard, S. Schlichtharle, N. Kaempchen, and T. Bertram, "Track-to-track fusion with asynchronous sensors using information matrix fusion for surround environment perception," IEEE Transactions on Intelligent Transportation Systems, vol. 13, No. 4, pp. 1717-1726, 2012.
H. Li, F. Nashashibi, B. Lefaudeux, and E. Pollard, "Track-to-track fusion using split covariance intersection filter-information matrix filter (scif-imf) for vehicle surrounding environment perception," in IEEE International Conference on Intelligent Transportation Systems. IEEE, 2013, pp. 1430-1435.
I. Miller, M. Campbell, D. Huttenlocher, F.-R. Kline, A. Nathan, S. Lupashin, J. Catlin, B. Schimpf, P. Moran, N. Zych et al., "Team cornell's skynet: Robust perception and planning in an urban environment," Journal of Field Robotics, vol. 25, No. 8, pp. 493-527, 2008.
J. Levinson, J. Askeland, J. Becker, J. Dolson, D. Held, S. Kammel, J. Z. Kolter, D. Langer, O. Pink, V. Pratt, M. Sokolsky, G. Stanek, D. Stavens, A. Teichman, M. Werling, and S. Thrun, "Towards fully autonomous driving: systems and algorithms," in IEEE Intelligent Vehicles Symposium, Jun. 2011, pp. 163-168.
M. Delp, N. Nagasaka, N. Kamata, and M. R. James, "Classifying and passing 3d obstacles for autonomous driving," in IEEE International Conference on Intelligent Transportation Sytems, Nov. 2015, pp. 1240-1247.
B. Khaleghi, A. Khamis, F. O. Karray, and S. N. Razavi, "Multisensor data fusion: A review of the state-of-the-art," Journal of Information Fusion, vol. 14, No. 1, pp. 24-44, 2013.
H. Durrant-Whyte and T. C. Henderson, "Multisensor data fusion," in Spinger Handbook of Robotics, 2001.
C. Stiller, J. Hipp, C. Rossig, and A. Ewald, "Multisensor obstacle detection and tracking," Journal of Image and Vision Computing, vol. 18, No. 5, pp. 389-396, 2000.
M. Mahlisch, R. Schweiger, W. Ritter, and K. Dietmayer, "Sensorfusion using spatio-temporal aligned video and lidar for improved vehicle detection," in IEEE Intelligent Vehicles Symposium, Jun. 2006, pp. 424-429.

* cited by examiner

SYSTEMS AND METHODS FOR MULTI-SENSOR FUSION USING PERMUTATION MATRIX TRACK ASSOCIATION

CROSS REFERENCE TO RELATED APPLICATIONS

This application claims benefit of U.S. Provisional Application No. 62/471,010, filed on Mar. 14, 2017, which is herein incorporated by reference in its entirety.

TECHNICAL FIELD

The subject matter described herein relates in general to systems for combining sensor inputs from separate sensors and, more particularly, to associating separate tracks from different sensors using an optimization scheme implemented with a permutation matrix and an objective cost function.

BACKGROUND

Autonomous vehicles, also referred to as self-driving cars, navigate autonomously through an environment with minimal or no human input. To navigate autonomously, a vehicle determines a location within an environment so that various obstacles can be avoided and to ensure that the vehicle remains on the roadway. In general, autonomous vehicles use various sensors including, for example, LIDAR sensors, radar sensors, cameras, and other sensors to help the vehicle detect and identify obstacles and other features in the environment. Additionally, the vehicle may also use the sensors to precisely locate the vehicle within the environment.

In either case, each sensor has different characteristics that influence the accuracy and precision of tracks/trajectories produced from data of the separate sensors by associated trackers. For example, a LIDAR sensor may provide accurate positional data about an object but may provide speed estimation and long-range detection that are less reliable. Moreover, a RADAR sensor may provide accurate speed estimation while providing object detection that is less precise. Similarly, a camera sensor may provide accurate long range detection while experiencing less accuracy in other aspects.

Consequently, trajectories from the separate sensor data include tradeoffs between accuracy in position data, speed estimation, long-range detection, and so on. Moreover, combining information from the separate sensors/trackers together is a computationally intensive task that can encounter difficulties with determining how to combine the inputs and determining which input to trust.

SUMMARY

In one embodiment, example systems and methods relate to a manner of fusing sensor inputs using a permutation matrix and a deterministic annealing algorithm. For example, as separate inputs are received from different sensors, a disclosed system can generate tracks from the inputs. Thereafter, the system correlates tracks together for respective objects represented in the inputs. Thus, in one embodiment, the system effectively groups tracks for separate observed objects so that the tracks can be unified and/or otherwise analyzed together for the objects. In this way, sensor inputs can be correlated to facilitate improved path planning, object avoidance, and additional functions related to object tracking.

In one embodiment, a fusion tracking system for associating disparate tracks from multiple sensor inputs for observed objects is disclosed. The fusion tracking system includes one or more processors and a memory that is communicably coupled to the one or more processors. The memory stores a sensor module including instructions that when executed by the one or more processors cause the one or more processors to, in response to receiving a first input from a first sensor and a second input from a second sensor, generate the disparate tracks including first sensor tracks and second sensor tracks for the observed objects that correspond to the first input and the second input. The memory further stores a fusion module including instructions that when executed by the one or more processors cause the one or more processors to identify correlations between the first sensor tracks and the second sensor tracks by computing association likelihoods between the first tracks and the second tracks within a permutation matrix according to an objective cost function. The fusion module further includes instructions to control a vehicle according to the correlations.

In one embodiment, a non-transitory computer-readable medium is disclosed. The computer-readable medium stores instructions for associating disparate tracks from multiple sensor inputs for observed objects and that when that when executed by one or more processors cause the one or more processors to perform the disclosed functions. The instructions include instructions to, in response to receiving a first input from a first sensor and a second input from a second sensor, generate the disparate tracks including first sensor tracks and second sensor tracks for the observed objects that correspond to the first input and the second input. The instructions include instructions to identify correlations between the first sensor tracks and the second sensor tracks by computing association likelihoods between the first tracks and the second tracks within a permutation matrix according to an objective cost function. The instructions include instructions to control a vehicle according to the correlations.

In one embodiment, a method of associating disparate tracks from multiple sensor inputs for observed objects is disclosed. The method includes in response to receiving a first input from a first sensor and a second input from a second sensor, generating the disparate tracks including first sensor tracks and second sensor tracks for the observed objects that correspond to the first input and the second input. The method includes identifying correlations between the first sensor tracks and the second sensor tracks by computing association likelihoods between the first tracks and the second tracks within a permutation matrix according to an objective cost function. The method includes controlling a vehicle according to the correlations.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with track-to-track association for multi-sensor inputs of observed objects are disclosed. As mentioned previously, an autonomous vehicle can include several different sensors having particular properties that influence the accuracy/precision of various measurements from the sensors. Moreover, because the autonomous vehicle relies on inputs from the sensors to perceive objects and thus to avoid the objects and navigate through the environment, an accurate/precise portrayal of the objects is generally desirable.

Therefore, in one embodiment, a fusion tracking system accepts inputs from separate sensors in the form of, for example, separate tracks of disparate observed objects. The fusion tracking system can, for example, associate the separate tracks between the sensors to provide unified or at least associated tracks as an output. For example, the fusion tracking system can determine a correspondence between the disparate tracks from the sensors using a permutation matrix that provides for comparing separate tracks from the separate sensors so that correlating tracks can be associated and subsequently unified.

Moreover, in one embodiment, the fusion tracking system uses an objective cost function that is resolved according to a deterministic annealing algorithm to provide soft decisions about an association likelihood between the separate disparate track. Once the fusion tracking system converges on, for example, an optimal solution, the fusion tracking system can normalize the soft decisions of the permutation matrix to provide a binary permutation matrix that associates the separate tracks as an output. Subsequently, the fusion tracking system can filter the associated tracks into unified tracks and/or otherwise provide the associations to, for example, an autonomous driving module for use in autonomously controlling the vehicle. In this way, the fusion tracking system can provide tracks for observed objects with, for example, improved characteristics over individual tracks.

Figure 1:
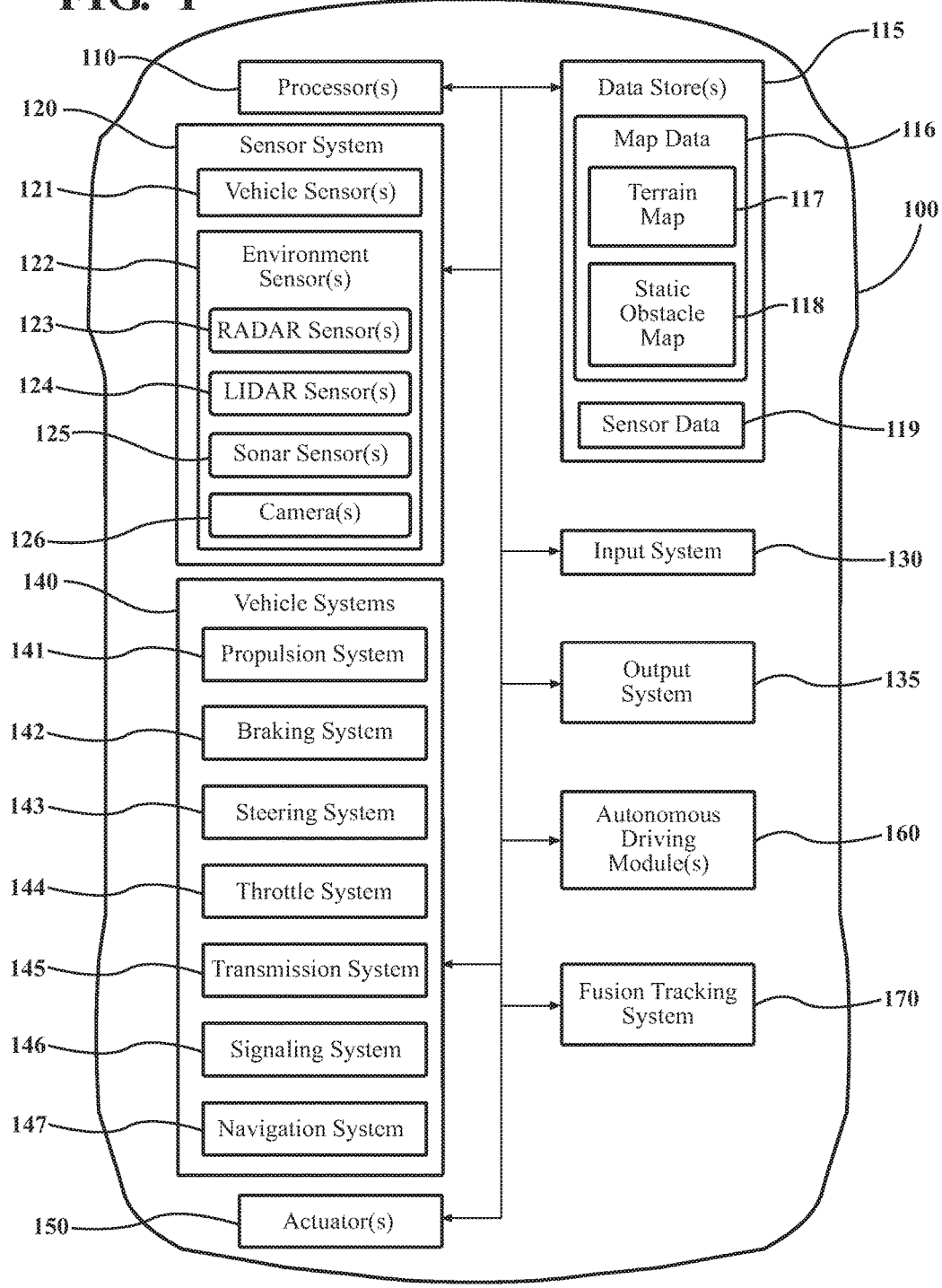
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, includes multiple sensors that track objects and for which a combined/unified track and/or associated tracks may be beneficial as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a fusion tracking system 170 that is implemented to perform methods and other functions as disclosed herein relating to associating multiple separate tracks for observed objects. The noted functions and methods will become more apparent with a further discussion of the figures.

Figure 2:
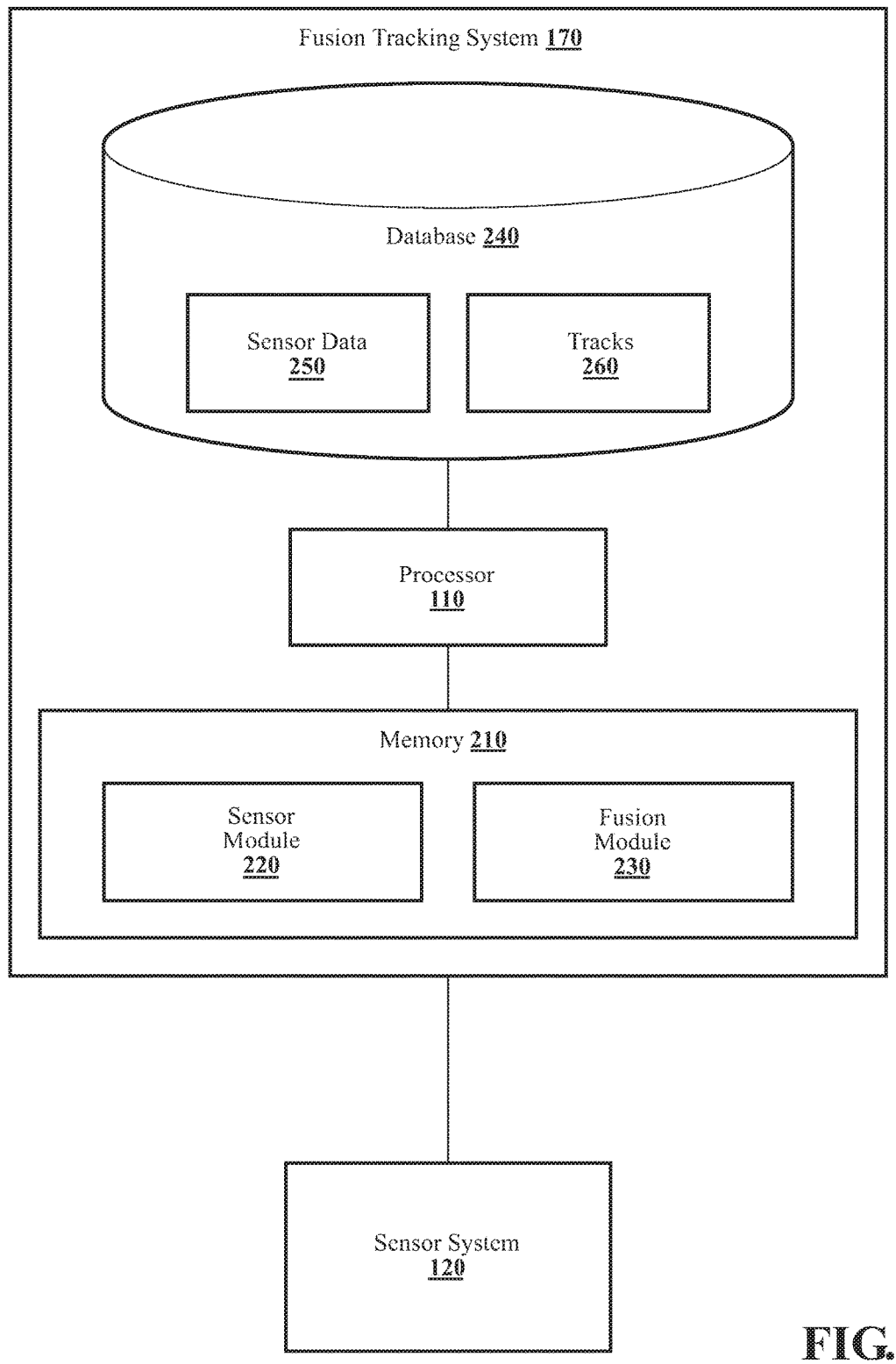
FIG. 2 illustrates one embodiment of a fusion tracking system that is associated with determining correlations between tracks from separate sensor inputs.

With reference to FIG. 2, one embodiment of the fusion tracking system 170 of FIG. 1 is further illustrated. The fusion tracking system 170 is shown as including a processor 110 from the vehicle 100 of FIG. 1. Accordingly, the processor 110 may be a part of the fusion tracking system 170, the fusion tracking system 170 may include a separate processor from the processor 110 of the vehicle 100, or the fusion tracking system 170 may access the processor 110 through a data bus or another communication path. In one embodiment, the fusion tracking system 170 includes a memory 210 that stores a sensor module 220 and a fusion module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the sensor module 220 generally includes instructions that function to control the processor 110 to receive a first input from a first sensor of the vehicle and a second input from a second sensor of the vehicle. The inputs are, in one embodiment, observations of one or more objects in an environment proximate to the vehicle 100. Subsequently, the sensor module 220 can generate tracks for the observed objects according to the inputs. That is, the sensor module 220 can produce multiple tracks for each separate input. The multiple tracks for a given sensor input correlate with separate objects observed by the particular sensor. The tracks are, for example, trajectories that include present velocities, positions, and headings for the object as determined from the respective sensor inputs. Consequently, the sensor module 220 can produce multiple disparate tracks 260 for each observed object since individual tracks are separately produced on a per object and per input basis.

More particularly, in one embodiment, separate sensor specific trackers can be included as part of the sensor module 220. The trackers are, for example, separately configured and assigned to the separate sensors. Thus, in one embodiment, as the sensor module 220 receives the sensor data 250 (i.e., sensor inputs) from individual sensors of the sensor system 120, the individual trackers separately generate the tracks 260 according to data from respective sensors. Thus, the separate trackers can produce separate tracks for each separately observed object represented in the acquired data. In this way, multiple tracks for a single observed object can be generated. Moreover, when considered in relation to multiple objects being tracked at any given timestamp, the sensor module 220 can produce a plurality of disparate tracks 260 including redundant tracks from the separate trackers for individual observed objects. It should be noted, that while the sensor module 220 is discussed as including trackers, in one embodiment, the separate trackers can be embedded within the respective sensors and/or within a separate system of the vehicle 100.

Moreover, in one embodiment, the fusion tracking system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 and the tracks 260 along with, for example, metadata that characterizes various aspects of the sensor data 250 and the tracks 260. For example, the metadata can include location coordinates (e.g., longitude and latitude), relative map coordinates or tile identifiers, time/date stamps from when the separate sensor data 250 was generated, and so on. Moreover, the tracks 260 may include unified tracks generated by the fusion module 230 from associated individual ones of the tracks 260.

Moreover, in one embodiment, the fusion module 230 generally includes instructions that function to control the processor 110 to compute correlations between the disparate observed objects. For example, the fusion module 230 analyzes a permutation matrix using an objective cost function to characterize correlations (e.g., association likelihood) between the tracks. Additionally, the fusion module 230 can, in one embodiment, control the vehicle 100 according to unified tracks generated for the observed objects from the computed correlations. For example, the fusion module 230 in combination with the autonomous driving module 160 can cause the vehicle to accelerate, decelerate, or otherwise maneuver according to the unified tracks. In this way, tracks for observed objects can be provided with improved characteristics that reflect advantages of the different types of sensors from which the inputs are available.

Figure 3:
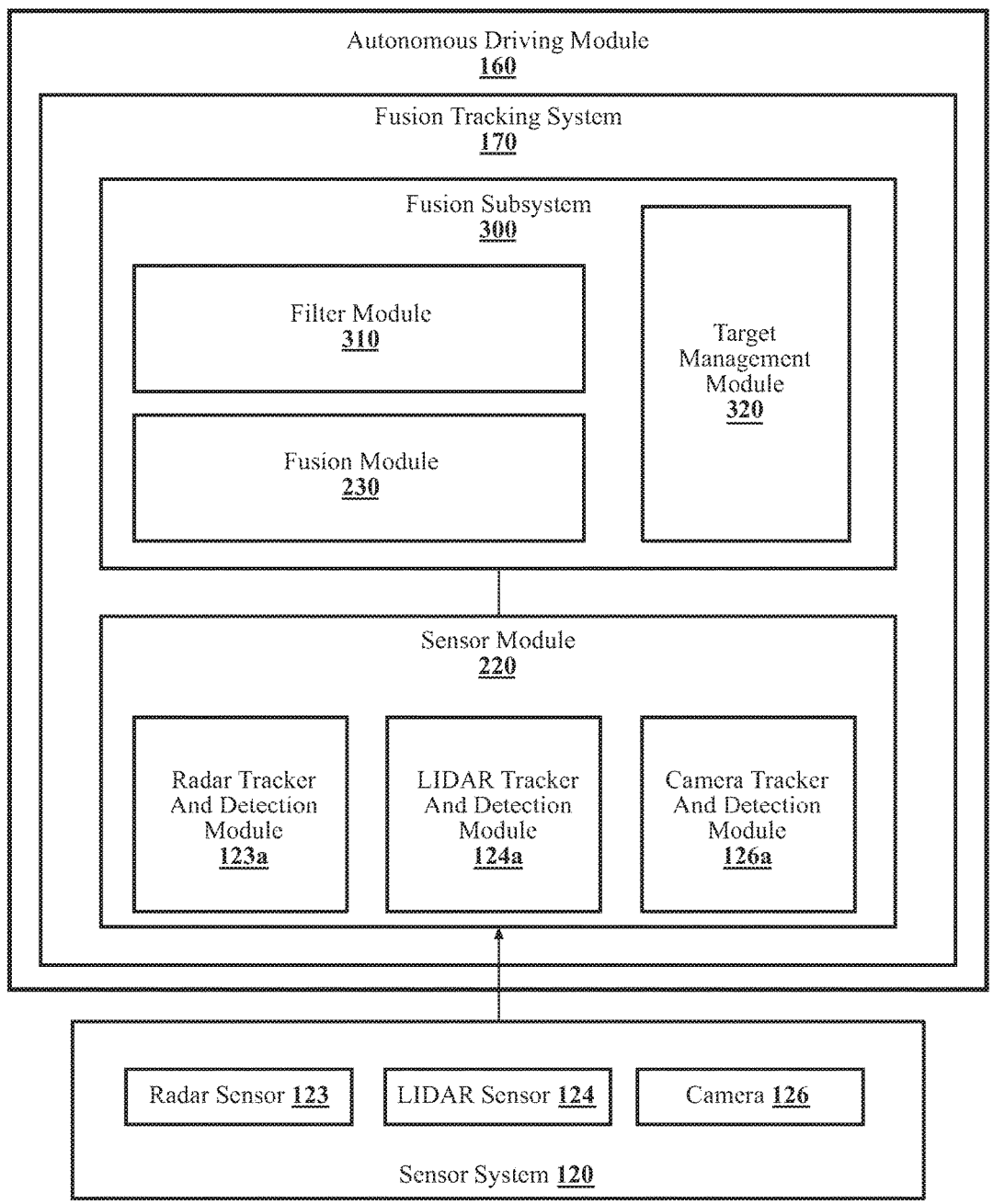
FIG. 3 illustrates another embodiment of a fusion tracking system that is associated with reconciling multiple tracks from different sensor inputs and trackers for observed objects.

FIG. 3 illustrates a further example of how the fusion tracking system 170 can be implemented together with the autonomous driving module 160 and the sensor system 120. As illustrated in FIG. 3, the fusion tracking system 170 is illustrated as a sub-component of the autonomous driving module 160. This is because, for example, the associated and/or unified tracks produced by the fusion tracking system 170 are, in one embodiment, output to the autonomous driving module 160 for path planning and/or other autonomous driving functions.

Moreover, the sensor module 220 is illustrated as including subcomponents that are separate tracks associated with different sensor inputs accepted by the fusion tracking system 170. While three separate trackers 123*a*, 124*a*, and 126*a* are illustrated, in other embodiments, additional or fewer trackers can be included. In either case, the sensor module 220 is illustrated as including a radar tracker and detection module 123*a*, a LIDAR tracker and detection module 124*a*, and a camera tracker and detection module 126*a*. In general, the sensor module 220 acquires observed data from the respective sensors 123, 124, and 126 as sensor inputs. The sensor inputs are, for example, raw electronic data produced by the sensors 123, 124, and 126 when the sensors scan a surrounding environment of the vehicle 100. As with the trackers, in various embodiments, additional or fewer sensors can be present and in communication with the sensor module 220. Moreover, in various embodiments, the sensor module 220 can at least partially electronically control the separate sensors 123, 124, and 126 of the sensor system 120 to scan and acquire the raw electronic data. For example, the sensor module 220 can provide electronic control signals to the sensors to induce the sensors to scan and/or perform other actions.

The trackers 123*a*, 124*a*, and 126*a*, while illustrated within the sensor module 220 can also be co-located within the respective sensor 123, 124, and 126 themselves or within another processing module of the vehicle 100. In either case, the trackers 123*a*, 124*a*, and 126*a* generally function to process the raw data from the respective sensors in order to (i) detect observed objects that are represented in the raw data and (ii) generate tracks/trajectories for the observed objects. The trajectories generally include velocity, position, and heading information. However, in various embodiments, the separate trajectories from the different trackers can include different information elements depending on, for example, how reliably the raw data from the respective sensors can be utilized to generate the particular information element.

In either case, the sensor module 220 acquires the tracks from the separate trackers for the observed objects. Thus, the sensor module 220 can output multiple tracks for each object. The multiple tracks being separately derived by the individual trackers. Accordingly, the disparate tracks are electronically communicated to the fusion module 230. As illustrated in FIG. 3, the fusion module 230 is a sub-component of a fusion subsystem 300. The fusion subsystem 300 is illustrated as including the fusion module 230, a filter module 310, and a target management module 320. In general, the fusion module 230 associates tracks from the separate trackers in order to provide corresponding tracks for respective observed objects in an associated form. The filter module 310, in one embodiment, filters the correlating tracks as specified by the fusion module 230 using a Kalman filter or other type of filter into a unified track for each respective object. Moreover, the target management module 320, in one embodiment, processes the corresponding tracks along with additional data to output a refined estimation of a unified track for each observed object. Furthermore, in various embodiments, the target management module 320 can perform path planning, decision making for object avoidance, and/or other autonomous driving functions using information provided by the modules 310 and 230.

Figure 4:
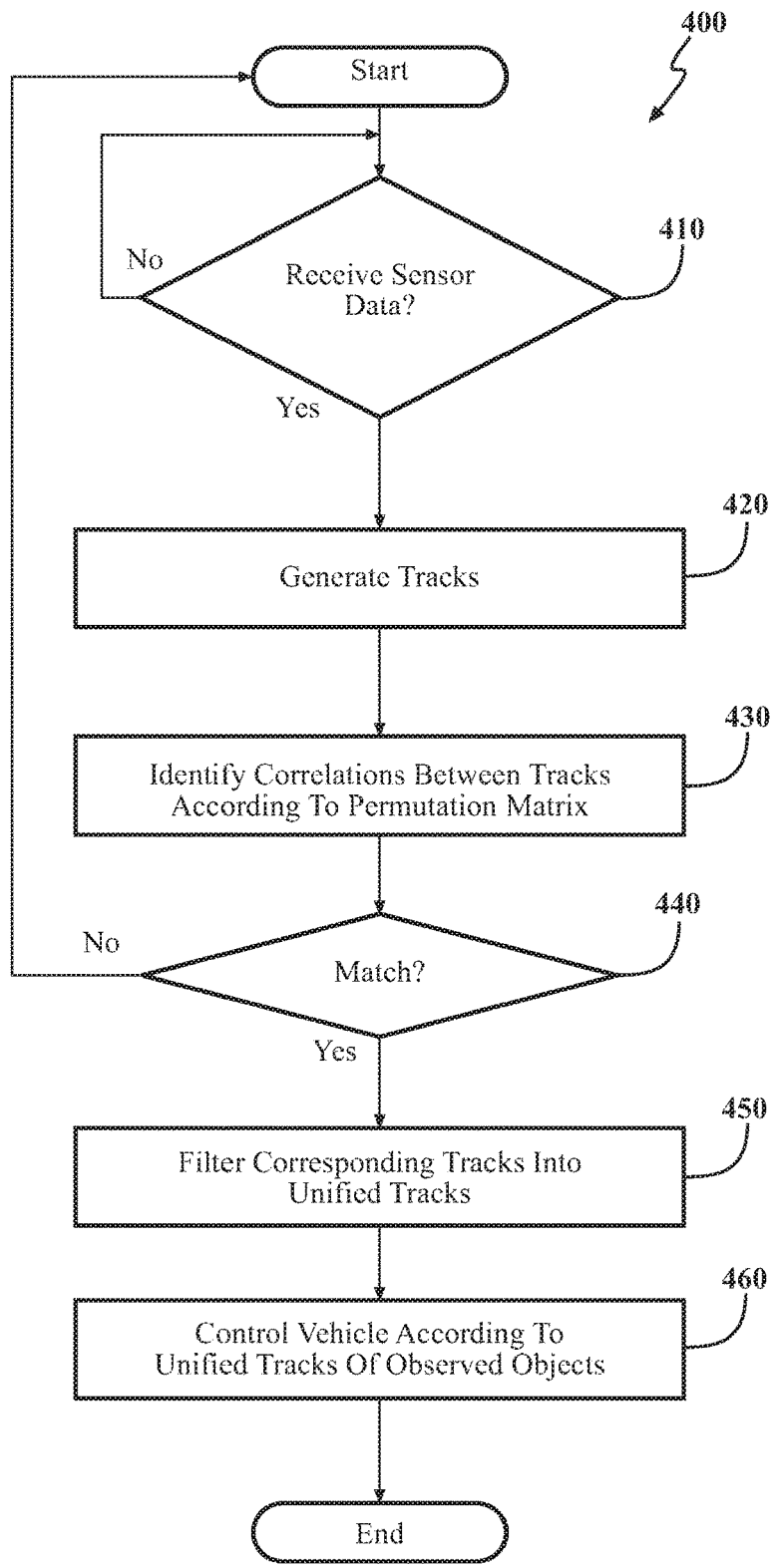
FIG. 4 illustrates one embodiment of a method that is associated with identifying correlations between multiple disparate tracks for observed objects.

Additional aspects of associating disparate tracks from multiple sensors will be discussed in relation to FIG. 4. FIG. 4 illustrates a flowchart of a method 400 that is associated with identifying correlations between disparate tracks from multiple sensor inputs for observed objects. Method 400 will be discussed from the perspective of the fusion tracking system 170 of FIGS. 1, 2, and 3. While method 400 is discussed in combination with the fusion tracking system 170, it should be appreciated that the method 400 is not limited to being implemented within the fusion tracking system 170, but is instead one example of a system that may implement the method 400.

At 410, the sensor module 220 receives sensor inputs. In one embodiment, the sensor inputs are raw data, as previously discussed, that are received from various sensors of the sensor system 120. As presented in this discussion, the fusion tracking system 170 generally receives inputs from three separate sensors, the radar 123, the lidar 124, and the camera 126. However, in various embodiments, the fusion tracking system 170 can acquire sensor inputs from additional sensors or from fewer sensors in addition to using, for example, a different set of sensors (e.g., sonar 125 in place of radar 123, etc.). In either case, the fusion tracking system 170 is generally provided in a robust manner to accommodate various combinations of sensor inputs.

At 420, the sensor module 220 generates individual tracks for the separate sensor inputs. That is, the sensor module 220 calculates tracks according to the acquired sensor inputs. As previously specified in relation to FIG. 3, in one embodiment, individual trackers can generate the separate tracks 260 in response to receiving the sensor inputs from respective ones of the sensors. Thus, each separate tracker may generate separate tracks for observed objects.

Moreover, the tracks 260 are trajectories that are electronically calculated from the sensor inputs and are associated with the observed objects. Thus, the tracks generally include information about a position, speed, heading, and/or other information about the observed objects. However, it should be appreciated that because of various particularities of different sensors, some tracks can include more information while other tracks produced from data of other sensors can include less comprehensive information. In either case, the sensor module 220 generally produces the tracks and/or updates the tracks for the observed objects according to a scan frequency of the separate sensors. In one embodiment, the sensor module 220 can select the scan frequency according to a particular implementation and may range from, for example, multiple scans per second to scans on a less frequency basis.

At 430, the fusion module 230 identifies correlations between the tracks provided by the sensor module 220. In one embodiment, the fusion module 230 identifies the correlations by computing association likelihoods using an objective cost function. The objective cost function quantizes the correlations between the disparate tracks of the observed objects. The objective cost function can be comprised of sub-costs such as a spatial cost, a temporal cost, a mismatched cost, an entropy cost, and so on. Further aspects of the different costs and associated computations will be discussed in relation to FIG. 5, subsequently. However, it should be appreciated, that a general approach described herein, in one embodiment, uses a permutation matrix P to associate the separate tracks between sensor inputs.

$$\hat{P} = \underset{P}{\operatorname{argmax}} J(P, X_1, X_2), \quad (1)$$

$$\text{s.t. } P_{ij} \in \{0, 1\}, \forall i \leq M+1, \forall j \leq N+1, \quad (2)$$

$$\sum_{i=1}^{M+1} P_{ij} = 1 \forall j \leq N, \sum_{i=1}^{N+1} P_{ij} = 1 \forall i \leq M, \quad (3)$$

$$P_{ij} \geq 0 \forall i \leq M+1, \forall j \leq N+1, \quad (4)$$

Figure 5:
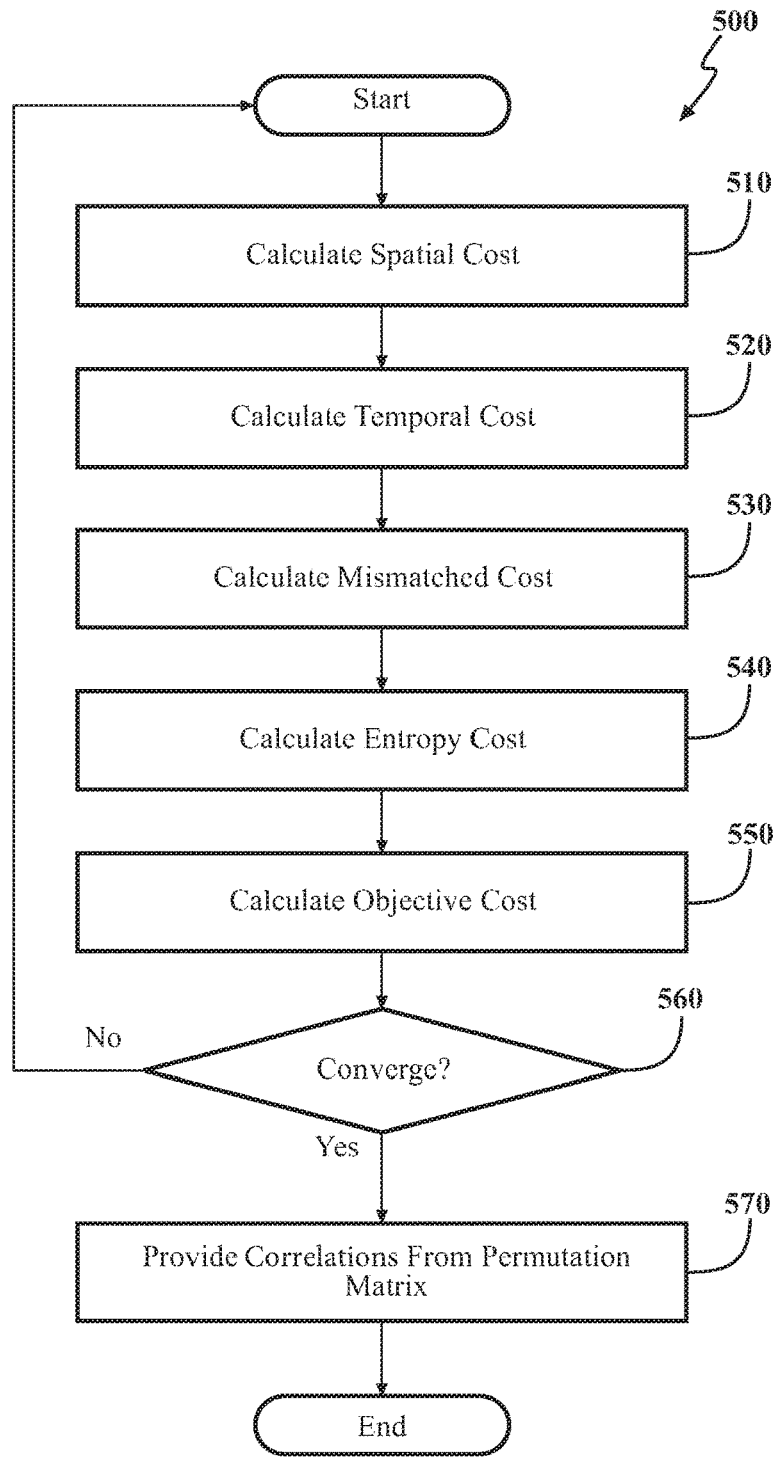
FIG. 5 illustrates one embodiment of a method that is associated with computing an association likelihoods over multiple iterations using a permutation matrix.

As will be discussed in further detail in relation to FIG. 5, the hard decision constraint shown in EQ 2 can be relaxed to a soft decision, as shown in EQ. 4 and a stochastic optimization (e.g., deterministic annealing) or other optimization approach can be applied to the permutation matrix P to generate the association likelihoods, e.g., the quantized correlations between tracks. For example, consider two sets of observed objects, $X_1$ and $X_2$, representing two sets of inputs from sensor $s_1$ (e.g., Radar 123) and $s_2$ (e.g., Lidar 124), respectively where $X_1=[x_{11} \ldots x_{1M}]$, $X_2=[x_{21} \ldots x_{2N}]$. As shown, $x_{1i}$ is the ith observed object from the sensor $s_1$, $x_{2j}$ is the jth observed object from the sensor $s_2$, and, thus, M and N are the number of the tracks/trajectories for the observed objects in $s_1$ and $s_2$ at a particular timestamp. Accordingly, a resulting matrix provides indices that separately correlate each of the separate tracks.

Moreover, in one embodiment, to determine the correlations between the tracks, the fusion module 230 undertakes an analysis of a (M+1)×(N+1) binary permutation matrix $\hat{P}$, such that an entry $P_{ij}$ in P is 1 if $x_{1i}$ corresponds to $x_{2j}$; otherwise, $P_{ij}$ is 0. In the matrix P, each row and column indicates a track of an observed object from $s_1$ and $s_2$, and the (M+1)th row and the (N+1)th column represent a mismatched correspondence. Therefore, the example approach can be formulized as shown in EQ 1-4. In the illustrated equations, J is an objective cost function to be optimized (e.g., minimized) according to the noted approach. The equations (2) and (3) are, for example, constraint equations that control the solution to provide a one-to-one association between the tracks.

Furthermore, as previously noted, by incorporating the soft-assign shown in EQ (4) instead of a hard decision as shown in EQ (2), the equation can be relaxed by, for example, temporarily replacing EQ (2) during the optimization. Thus, an entry $P_{ij}$ of the permutation matrix $\hat{P}$ can be a likelihood of the ith observed object/track from $s_1$ matching/correlating with the jth observed object/track from $s_2$. In one embodiment, the fusion module 230 electronically computes the correlations by processing the permutation matrix $\hat{P}$ using the noted deterministic annealing algorithm while the EQ (2) is relaxed to EQ (4) to thereby avoid trapping the analysis in a local minimum during optimization. Moreover, the fusion module 230 can also improve the convergence to the EQ (1). The particular analysis at 430 will be further discussed in relation to FIG. 5.

In either case, the fusion module 230 generally identifies correlations between the separate disparate tracks produced from the sensor inputs of the separate sensors. In this way, tracks from the separate sensors that are of the same observed objects can be correlated/grouped in order to provide information about the observed objects from multiple different sensors. As an additional note, while two sensors and associated tracks are mentioned in relation to block 430, in various embodiments, additional sensors can also be correlated as will be discussed further in relation to FIG. 5.

At 440, the fusion module 230 determines whether the analysis from 430 converged on a solution. That is, in one embodiment, the fusion module 230 can determine whether the identified correlations satisfy a threshold for indicating that two tracks correlate. In one embodiment, the threshold may indicate a minimum percentage of correlation, a confidence interval for the correlation or another metric that facilitates the fusion module 230 ensuring the correspondence is valid. Thus, if the fusion module 230 determines that the correlations from 430 are not satisfied, then the fusion tracking system 170 can abort the present calculations and restart at 410 with new sensor inputs and/or performs other additional actions. Otherwise, the fusion module 230 determines the threshold is satisfied and continues to block 450.

At 450, the fusion subsystem 300 computes unified tracks for the observed objects. In one embodiment, the fusion subsystem and, more particularly, the filter module 310 filter the corresponding tracks as indicated by the determination at 430. For example, in one embodiment, an unscented Kalman filter is applied to the corresponding tracks to produce a unified track for each observed object. In further embodiments, the fusion subsystem 300 can apply other approaches to compute the unified tracks such as a Naïve Information Matrix Filter, a generalized information matrix filter, a covariance intersection, and so on.

At 460, the fusion module 230 controls the vehicle 100 according to the correlations. In one embodiment, the fusion module 230 controls the vehicle 100 by, for example, providing the the correlations from block 430 to the target management module 320 and/or the autonomous driving module 160. In further aspects, the fusion module 230 and/or the fusion subsystem 300 can provide the unified tracks for controlling the vehicle 100. In general, the unified tracks and/or the correlations can inform the noted modules about positions, headings, speeds, and other information of the observed objects so that path planning, object avoidance, and other autonomous driving and/or collision avoidance functions can be performed. In this way, the vehicle 100 can, for example, improve the quality of the collected and computed information about the observed objects to provide more accurate and precise controls.

Further aspects of associating the disparate tracks will be discussed in relation to FIG. 5. FIG. 5 illustrates a method 500 that is, for example, executed at block 430 of Method 400 to perform the noted operations of identifying correlations. As with method 400 of FIG. 4, method 500 is discussed from the perspective of the fusion tracking system 170. However, it should be appreciated that the method 500 is not limited to being implemented within the fusion tracking system 170, but is instead one example of a system that may implement the method 500.

At 510, the fusion module 230 initiates analysis of the disparate tracks by computing a spatial cost of the objective cost function. Computing the spatial cost identifies a spatial association likelihood between the disparate tracks by, for example, quantizing differences in a euclidian distance between the disparate tracks. Accordingly, in one embodiment, the the spatial cost includes components for object position, object velocity, and object forwarding direction. Thus, the spatial cost component of the objective cost function considers general spatial information of an observed object to quantize how closely two tracks correlate.

As one example, assume $d_p$, $d_v$, and $d_\phi$, are the measurement differences between $x_{ij}$ and $x_{2j}$, with respect to the position, velocity and forwarding direction. Accordingly, for the noted example, the association likelihood for the particular indice of the permutation matrix is defined by:

$$l_s(x_{1i}, x_{2j}) = K(d_p, \sigma_p^2) \cdot K(d_v, \sigma_v^2) \cdot K(d_\phi, \sigma_\phi^2), \quad (5)$$

Thus, Equation (5) represents a computation executed by the fusion module 230 that provides the spatial cost component of the objective cost function. However, as a further aspect of the fusion module 230 computing the spatial cost at 510, $K(\cdot)$ is a radial basis function (RBF); $\sigma_p^2$, $\sigma_v^2$, and $\sigma_\phi^2$ are predefined variances of each RBF kernel respectively. Consequently, based on the likelihood, the fusion module 230 applies a maximum likelihood approach to represent the confidence of the association:

$$J_{spatial} = -\Sigma_{i=1}^{M} \Sigma_{j=1}^{N} P_{ij} \log(l_s(x_{1i}, x_{2j})) \quad (6)$$

Thus, in one embodiment, the fusion module 230 generates the spatial association likelihood at 510 according to EQ (6).

At 520, the fusion module 230 computes a temporal cost. In one embodiment, the temporal cost identifies a temporal association likelihood between the disparate tracks by identifying whether the disparate tracks from a current observation correlate with previous tracks from a previous observation. That is, the present track is compared with data from a previous timestamp in order to determine how close the track correlates in a temporal manner. In one embodiment, the fusion module 230 assumes the association between the tracks follows the Markov property, which implies a current association is only affected by a previous association. The temporal association likelihood of the $x_{1i}$ and $x_{2j}$ at the previous timestamp, $P'_{ij}$, is considered in the temporal cost to provide a temporal association likelihood according to EQ (7) below.

$$J_{temporal} = -\Sigma_{i=1}^{M} \Sigma_{j=1}^{N} P_{ij} \log(P'_{ij}), \quad (7)$$

As provided in EQ (7), $P_{ij}$ is the temporal association likelihood at a current timestamp while $P'_{ij}$, is a previous temporal association likelihood.

At 530, the fusion module 230 computes a mismatched cost. In one embodiment, the mismatched cost penalizes the association likelihoods for ones of the disparate tracks in the permutation matrix that do not correlate. For example, the fusion module 230 penalizes mismatched tracks in order to further emphasize tracks that correlate/match.

Thus, the fusion module 230, for $x_{1i}$ and $x_{2i}$ that are not associated, modifies the permutation matrix at the particular indice to penalize the mismatched association. In one embodiment, instead of increasing the cost in the (M+1)th row and (N+1)th column of P, i.e., mismatched entries, the fusion module 230 reduces a value of the $P_{ij}$ for $1 \leq i \leq M$ and $1 \leq j \leq N$, i.e., matched entries. Equation (8) illustrates one embodiment of how the fusion module 230 can compute the mistmatched cost.

$$J_{mismatched} = -\beta \Sigma_{i=1}^{M} \Sigma_{j=1}^{N} P_{ij}, \quad (8)$$

As an additional note, a value of $\beta$ is a defined factor for controlling the penalty cost when an indice $x_{1i}$ and $x_{2j}$ is mismatched. In general, the value is implementation dependent and can be selected according to particular aspects of the sensors and, for example, expected data values.

At 540, the fusion module 230 computes an entropy cost. In one embodiment, the fusion module 230 uses the entropy cost to vary the association likelihoods produced by the objective cost function within indices of the permutation matrix over iterations of computing the association likelihoods to avoid local minima. For example, the fusion module uses the entropy cost to optimize the deterministic annealing algorithm in an iterative scheme to stress an "uncertainty," as well as the entropy of the entries in P. The fusion module 230 can compute the entropy cost as shown in EQ (9) below.

$$J_{entropy} = -\gamma \Sigma_{i=1}^{M+1} \Sigma_{j=1}^{N+1} P_{ij} \log(P_{ij}), \quad (9)$$

Accordingly, in the early iterations of the method 500, the fusion module 230 initializes a factor γ at a higher value in order to emphasize the impact of the entropy cost with respect to the objective cost function J(P, $X_1$, $X_2$). In this way, the fusion module 230 can provide for flexibility in a value $P_{ij}$ for searching an optimum. Accordingly, for subsequent iterations of 510-550 when the search does not converge at 560, γ is gradually, for example, decreased over the iterations in order to control the value $P_{ij}$ for convergence. By incorporating the maximum entropy principle, the entropy cost can also be regarded as a barrier function for the inequality constraints in Eq. (4).

At 550, the fusion module 230 computes the association likelihoods using the objective cost function shown in EQ (10) below. In one embodiment, the fusion module 230 provides the association likelihoods as soft-decisions within indices of the permutation matrix to identify with finer granularity how closely the tracks correspond.

$$J(P,X_1,X_2)=J_{spatial}+J_{temporal}+J_{mismatched}+J_{entropy}. \quad (10)$$

However, in one embodiment, the fusion module 230 normalizes the soft-decisions in the permutation matrix into hard decisions that are the identified correlations. In one embodiment, the fusion module 230 applies row-column normalization to the permutation matrix according to Sinkhorn's theorem to generate the correlations and restore the permutation matrix to a binary permutation matrix.

At 560, the fusion module 230 determines whether the objective cost function computed previously over the permutation matrix has converged on a solution. In one embodiment, the fusion module 230 analyzes the values of the rows and columns to determine whether a threshold has been satisfied for converging on the correlations. In another embodiment, the fusion module 230 executes the analysis over blocks 510-550 for a defined number of iterations. In still a further embodiment, the fusion module 230 executes the analysis over the blocks 510-550 until the entropy value used at block 540 has been decreased to a particular value. Moreover, in further aspects, various combinations of the above determinations can be implemented by the fusion module 230 to determine when the permutation matrix converges on a solution. Matrix P1 below illustrates a permutation matrix with converged values prior to the permutation matrix being normalized. It should be noted that, in general, the fusion module 230 iteratively executes the functions discussed in relation to blocks 510-550 until values of the permutation matrix converge on a solution as illustrated in Matrix P1, below.

| Matrix P1 | y_1 | y_2 | y_3 | mismatched |
|---|---|---|---|---|
| x_1 | 0.90 | 0.08 | 0.01 | 0.01 |
| x_2 | 0.01 | 0.10 | 0.19 | 0.70 |
| x_3 | 0.03 | 0.77 | 0.15 | 0.05 |
| mismatched | 0.06 | 0.05 | 0.65 | — |

Moreover, as represented in Matrix P1, x_1 correlates with y_1, x_3 correlates with y_2; however, x_2 and y_3 do not correlate, and thus values represented in the mismatched column represent this lack of correlation. Additionally, in one embodiment, as a general constraint, the sum of each column and row is 1 except for the last row and column. A normalized form of Matrix P1 is represented by Matrix P2 below.

| Matrix P2 | y_1 | y_2 | y_3 | mismatched |
|---|---|---|---|---|
| x_1 | 1 | 0 | 0 | 0 |
| x_2 | 0 | 0 | 0 | 1 |
| x_3 | 0 | 1 | 0 | 0 |
| mismatched | 0 | 0 | 1 | — |

The hard decisions in Matrix P2 represent the correlations identified by the fusion module 230 and are the correlations provided, at 570, by the fusion module 230 as an output of the analysis of the permutation matrix.

As an additional note, the fusion tracking system 170 has been illustrated and discussed with three different types of sensor inputs. However, the previous discussion focuses on identifying correlations between two sensors. Thus, to associate three sensors $s_1$, $s_2$ and $s_3$, the above noted objective cost function and analysis can be separately applied to each pair of the sensors, i.e., $s_1$ and $s_2$, $s_2$ and $s_3$, $s_1$ and $s_3$. For example, $x_{11}$ is associated with $x_{21}$, $x_{11}$ is associated with $x_{31}$, but $x_{21}$ is not associated with $x_{31}$; in this case, the system 170 selects, for example, the association with larger $P_{ij}$. In another example $x_{11}$ is associated with $x_{21}$ at timestamp t but associated with $x_{22}$ at timestamp t+1 due to misleading tracking results. Such spatial and temporal ambiguities are heuristically handled by the global target management unit 320. However, in either case, the fusion tracking system 170 is provided with modules and other routines to account for correlating and fusing inputs from multiple sensors (e.g., 3, 4, or more sensors).

Figure 6:
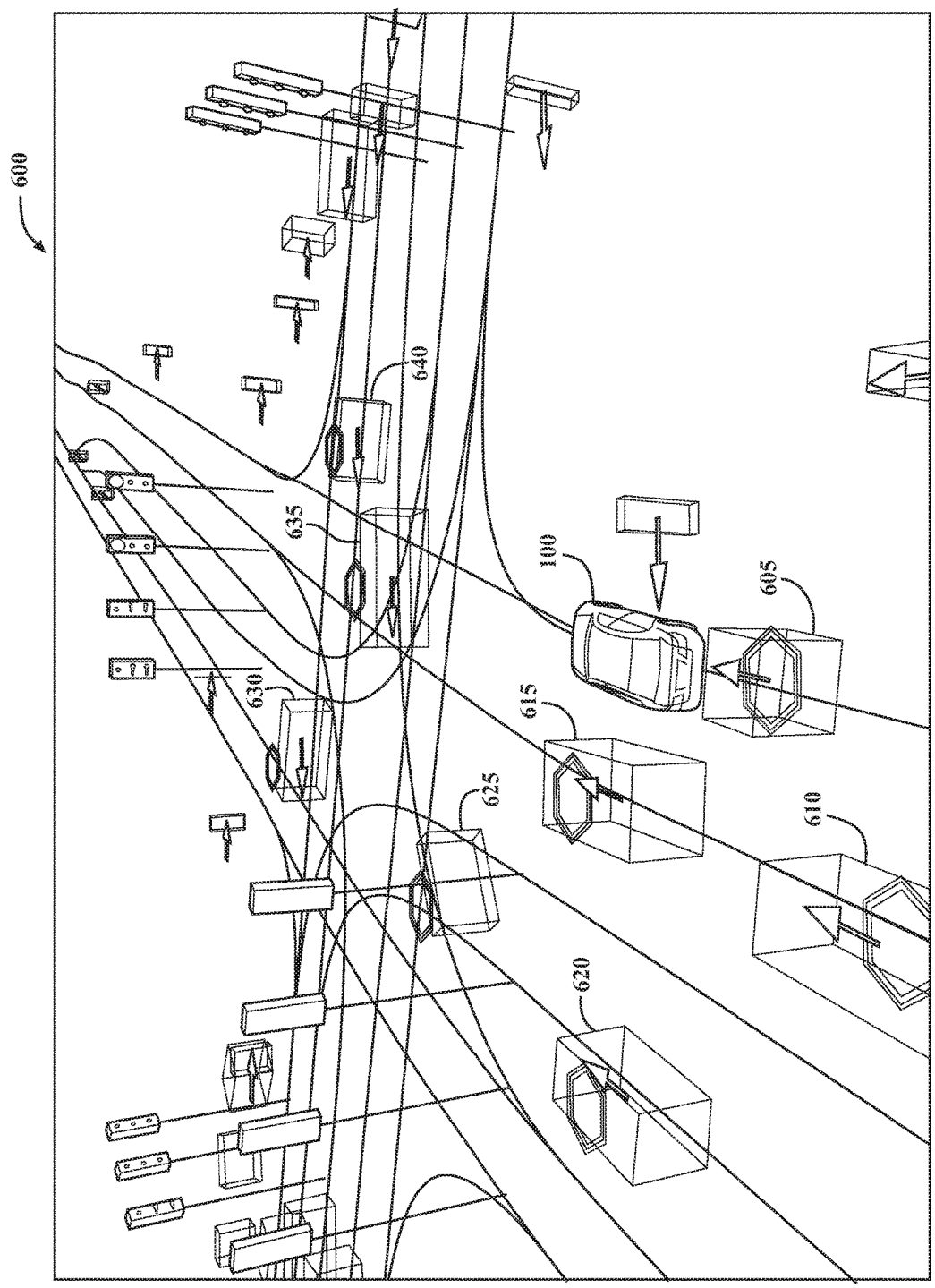
FIG. 6 illustrates one example of combined tracks for multiple objects proximate to a vehicle.
Figure 7:
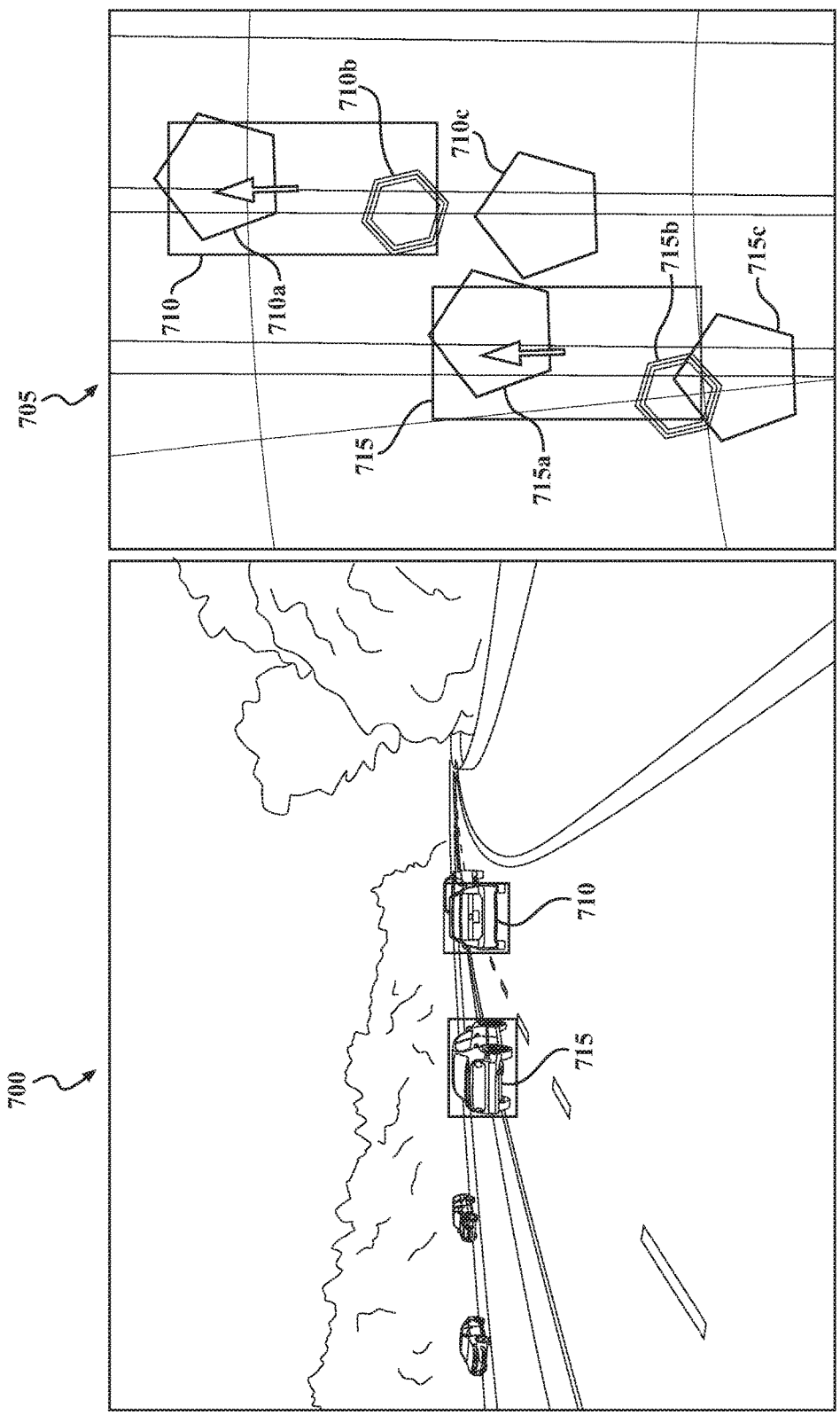
FIG. 7 illustrates one example of disparities between tracks of perceived objects provided from inputs of separate sensors.

As a further explanation of how the fusion tracking system 170 can operate discussion will now shift to FIGS. 6-7. FIG. 6 illustrates one example of an environment 600 around the vehicle 100 as perceived by the various sensors of the sensor system 120. For example, the environment 600 is illustrated as including a multitude of different objects that each have separate trajectories. As shown in FIG. 6, the sensors of the vehicle 100 produce inputs that are used to generate tracks for the various objects. The objects 605, 610, 615, 620, 625, 630, 635, and 640 are vehicles that each include separate trajectories as illustrated by the boxes and hexagons. Moreover, as shown in FIG. 6 disparities between the tracks are illustrated via misalignments between the hexagons and the boxes. Thus, the fusion tracking system 170 can accept inputs observing the objects 605-640 from the various sensors and correlate the separate tracks from the different sensors for the individual objects in order to provide a more robust determination of the separate trajectories.

As a further explanation of how the fusion tracking system 170 can acquire separate tracks for observed objects from separate sensor inputs, consider FIG. 7. FIG. 7 illustrates a camera image 700 and a perceived reconstruction 705 of the scene depicted in the image 700. The camera image 700 illustrates two separate objects 710 and 715 that are vehicles traveling ahead of the vehicle 100. For purposes of this discussion, consider that available sensor inputs correlate with the sensors illustrated in FIG. 3. Thus, the reconstruction 705 illustrates three separate tracks for each of the objects 710 and 715. In particular, the fusion tracking system 170 acquires tracks 710a, 710b, and 710c for object 710. Similarly, tracks 715a, 715b, and 715c are acquired for object 715. However, initially, the fusion tracking system 170 does not have enough information to distinguish which separate tracks correspond. That is, as one example, consider track 710c and track 715a. These two tracks include similar positional and heading characteristics and are, in actuality, tracks of separate objects but at first impression more closely align than some of the other tracks (e.g., 710*a* and 710*c*). These disparities are due to, for example, inaccuracies or general imprecision in the associated sensors. However, as the fusion tracking system 170 analyzes the provided tracks using the permutation matrix, the correlations result in 710*a*, 710*b*, and 710*c* being correlated along with 715*a*, 715*b*, and 715*c* being correlated. This is because of the complex analysis undertaken by the fusion tracking system to associate the disparate tracks.

As a result of the fusion module 230 correlating the tracks, in one example, unified tracks for the illustrated embodiment can be represented by the blocks in 705 for objects 710 and 715. Consequently, the fusion tracking system 170 can better correlate the separate tracks and improve upon a perception of the observed objects by the vehicle 100 in order to facilitate the functioning of the path planning, object avoidance, and other autonomous and/or semi-autonomous functionality of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the fusion tracking system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the fusion tracking system 170, and/or the autonomous driving module(s) 160 may control some or all of these vehicle systems 140 and, thus, may be partially or fully autonomous.

The processor(s) 110, the fusion tracking system 170, and/or the autonomous driving module(s) 160 can be operatively connected to communicate with the various vehicle systems 140 and/or individual components thereof. For example, returning to FIG. 1, the processor(s) 110, the fusion tracking system 170, and/or the autonomous driving module(s) 160 can be in communication to send and/or receive information from the various vehicle systems 140 to control the movement, speed, maneuvering, heading, direction, etc. of the vehicle 100. The processor(s) 110, the fusion tracking system 170, and/or the autonomous driving module(s) 160 may control some or all of these vehicle systems 140.

The processor(s) 110, the fusion tracking system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the fusion tracking system 170, and/or the autonomous driving module(s) 160 can control the direction and/or speed of the vehicle 100. The processor(s) 110, the fusion tracking system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the fusion tracking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A fusion tracking system for associating disparate tracks from multiple sensor inputs for observed objects, comprising:
   one or more processors;
   a memory communicably coupled to the one or more processors and storing:
   a sensor module including instructions that when executed by the one or more processors cause the one or more processors to, in response to receiving a first input from a first sensor and a second input from a second sensor, generate the disparate tracks including first sensor tracks and second sensor tracks for the observed objects that correspond to the first input and the second input; and
   a fusion module including instructions that when executed by the one or more processors cause the one or more processors to identify correlations between the first sensor tracks and the second sensor tracks by computing association likelihoods between the first sensor tracks and the second sensor tracks within a permutation matrix according to an objective cost function,
   wherein the fusion module further includes instructions to control a vehicle according to the correlations by generating unified tracks from the first sensor tracks and the second sensor tracks using the correlations, and wherein the unified tracks include trajectories of the observed objects that are comprised of inputs from separate sensors.

2. The fusion tracking system of claim 1, wherein the first sensor tracks and the second sensor tracks are trajectories of the observed objects as produced from separate trackers associated with the first sensor and the second sensor,
   wherein the fusion module further includes instructions to compute the association likelihoods using the objective cost function to quantize the correlations between the disparate tracks of the observed objects, wherein the objective cost functions is comprised of a spatial cost, a temporal cost, a mismatched cost, and an entropy cost, and
   wherein the first sensor tracks and the second sensor tracks include separate tracks for respective ones of the observed objects.

3. The fusion tracking system of claim 2, wherein the fusion module further includes instructions to compute the spatial cost to identify a spatial association likelihood between the disparate tracks by quantizing differences in a euclidian distance between the disparate tracks, wherein the spatial cost includes components for object position, object velocity, and object forwarding direction, and
   wherein the fusion module further includes instructions to compute the spatial association likelihood based, at least in part, on a radial basis function.

4. The fusion tracking system of claim 2, wherein the fusion module further includes instructions to compute the temporal cost to identify a temporal association likelihood between the disparate tracks by identifying whether the disparate tracks from a current observation correlate with previous tracks from a previous observation, and
   wherein the fusion module further includes instructions to compute the mismatched cost to penalize the association likelihoods for ones of the disparate tracks in the permutation matrix that do not correlate.

5. The fusion tracking system of claim 2, wherein the fusion module further includes instructions to compute the entropy cost to vary the association likelihoods within indices of the permutation matrix over iterations of the association likelihoods until converging on the correlations, and wherein the association likelihoods are soft-decisions within indices of the permutation matrix that identify how closely the disparate tracks correspond.

6. The fusion tracking system of claim 1, wherein the fusion module further includes instructions to identify the correlations between the first sensor tracks and the second sensor tracks by initially populating the permutation matrix according to the objective cost function using soft-decision values as the association likelihoods, wherein the association likelihoods indicate a likelihood that two tracks of the disparate tracks correlate, wherein the permutation matrix is a binary permutation matrix, and wherein the fusion module further includes instructions to identify the correlations by normalizing the association likelihoods within the permutation matrix into hard decisions that are the correlations upon the objective cost function converging.

7. The fusion tracking system of claim 1, wherein the first sensor tracks and the second sensor tracks include separate individual tracks for respective ones of the observed objects, wherein the first input and the second input are observations of an environment by the first sensor and the second sensor of the vehicle, respectively.

8. A non-transitory computer-readable medium storing instructions for associating disparate tracks from multiple sensor inputs for observed objects and that when executed by one or more processors cause the one or more processors to:

in response to receiving a first input from a first sensor and a second input from a second sensor, generate the disparate tracks including first sensor tracks and second sensor tracks for the observed objects that correspond to the first input and the second input;

identify correlations between the first sensor tracks and the second sensor tracks by computing association likelihoods between the first sensor tracks and the second sensor tracks within a permutation matrix according to an objective cost function; and control a vehicle according to the correlations including generating unified tracks from the first sensor tracks and the second sensor tracks using the correlations, and wherein the unified tracks include trajectories of the observed objects that are comprised of inputs from separate sensors of the vehicle.

9. The non-transitory computer-readable medium of claim 8, wherein the first sensor tracks and the second sensor tracks are trajectories of the observed objects as produced from separate trackers associated with the first sensor and the second sensor, wherein the instructions to compute the association likelihoods using the objective cost function quantize the correlations between the disparate tracks of the observed objects, wherein the objective cost functions is comprised of a spatial cost, a temporal cost, a mismatched cost, and an entropy cost, and wherein the first sensor tracks and the second sensor tracks include separate tracks for respective ones of the observed objects.

10. The non-transitory computer-readable medium of claim 9, wherein the instructions further include instructions to compute the spatial cost to identify a spatial association likelihood between the disparate tracks by quantizing differences in a euclidian distance between the disparate tracks, wherein the spatial cost includes components for object position, object velocity, and object forwarding direction, and wherein the instructions further include instructions to compute the spatial association likelihood based, at least in part, on a radial basis function.

11. The non-transitory computer-readable medium of claim 8, wherein the instructions to identify the correlations between the first sensor tracks and the second sensor tracks further include instructions to initially populate the permutation matrix according to the objective cost function using soft-decision values as the association likelihoods, wherein the association likelihoods indicate a likelihood that two tracks of the disparate tracks correlate, wherein the permutation matrix is a binary permutation matrix, and wherein the instructions to identify the correlations include instructions to normalize the association likelihoods within the permutation matrix into hard decisions that are the correlations upon the objective cost function converging.

12. A method of associating disparate tracks from multiple sensor inputs for observed objects, comprising:

in response to receiving a first input from a first sensor and a second input from a second sensor, generating the disparate tracks including first sensor tracks and second sensor tracks for the observed objects that correspond to the first input and the second input;

identifying correlations between the first sensor tracks and the second sensor tracks by computing association likelihoods between the first sensor tracks and the second sensor tracks within a permutation matrix according to an objective cost function; and controlling a vehicle according to the correlations including generating unified tracks from the first sensor tracks and the second sensor tracks using the correlations, and wherein the unified tracks include trajectories of the observed objects that are comprised of inputs from separate sensors of the vehicle.

13. The method of claim 12, wherein the first sensor tracks and the second sensor tracks are trajectories of the objects as produced from separate trackers associated with the first sensor and the second sensor, wherein computing the association likelihoods using the objective cost function quantizes the correlations between the disparate tracks of the observed objects and is comprised of a spatial cost, a temporal cost, a mismatched cost, and an entropy cost, and wherein the first sensor tracks and the second sensor tracks include separate tracks for respective ones of the observed objects.

14. The method of claim 13, wherein the spatial cost identifies a spatial association likelihood between the disparate tracks by quantizing differences in a euclidian distance between the disparate tracks, wherein the spatial cost includes components for object position, object velocity, and object forwarding direction, and wherein the spatial association likelihood is based, at least in part, on a radial basis function.

15. The method of claim 13, wherein the temporal cost identifies a temporal association likelihood between the disparate tracks by identifying whether the disparate tracks from a current observation correlate with previous tracks from a previous observation, and wherein the mismatched cost penalizes the association likelihoods for ones of the disparate tracks in the permutation matrix that do not correlate.

16. The method of claim 13, wherein computing the entropy cost varies the association likelihoods within indices of the permutation matrix over iterations of computing the association likelihoods until converging on the correlations, and wherein the association likelihoods are soft-decisions within indices of the permutation matrix that identify how closely the disparate tracks correspond.

17. The method of claim 12, wherein identifying the correlations between the first sensor tracks and the second sensor tracks includes initially populating the permutation matrix according to the objective cost function using soft-decision values as the association likelihoods, wherein the association likelihoods indicate a likelihood that two tracks of the disparate tracks correlate, wherein the permutation matrix is a binary permutation matrix, and wherein identifying the correlations includes normalizing the association likelihoods within the permutation matrix into hard decisions that are the correlations upon the objective cost function converging.

18. The method of claim 12, wherein the first sensor tracks and the second sensor tracks include separate individual tracks for respective ones of the objects, and wherein the first input and the second input are observations of an environment by the first sensor and the second sensor of the vehicle, respectively.

\* \* \* \* \*

UNITED STATES PATENT AND TRADEMARK OFFICE
CERTIFICATE OF CORRECTION

PATENT NO. : 10,466,361 B2  
APPLICATION NO. : 15/601433  
DATED : November 5, 2019  
INVENTOR(S) : Kuan-Hui Lee Page 1 of 1

It is certified that error appears in the above-identified patent and that said Letters Patent is hereby corrected as shown below:

In the Claims

Claim 2, Column 20, Line 37     Change "objective cost functions" to "objective cost function"

Claim 7, Column 21, Line 21     Add "and" after "objects,"

Claim 9, Column 21, Line 54     Change "objective cost functions" to "objective cost function"

Signed and Sealed this  
Twenty-fourth Day of November, 2020

Andrei Iancu  
*Director of the United States Patent and Trademark Office*